United States Patent [19]

Dedden et al.

[11] Patent Number: 4,929,829

[45] Date of Patent: May 29, 1990

[54] METHOD FOR DETECTING FLOODING OF A SURFACE

[75] Inventors: Hubert Dedden, Waldbroel-Hermesdorf; Eckhard Gieger, Leverkusen; Christian Lauer, Cologne, all of Fed. Rep. of Germany

[73] Assignee: Bayer Aktiengesellschaft, Leverkusen, Fed. Rep. of Germany

[21] Appl. No.: 389,443

[22] Filed: Aug. 4, 1989

[30] Foreign Application Priority Data

Aug. 25, 1988 [DE] Fed. Rep. of Germany ....... 3828821

[51] Int. Cl.$^5$ ............................................. G01N 15/06
[52] U.S. Cl. .................................. 250/208.4; 250/577; 356/436
[58] Field of Search ............... 250/227, 573, 574, 577; 356/436, 440

[56] References Cited

U.S. PATENT DOCUMENTS

| | | | |
|---|---|---|---|
| 3,790,156 | 6/1975 | Heigl et al. | 356/440 |
| 4,136,959 | 1/1979 | Honkawa et al. | 356/436 |
| 4,247,784 | 1/1981 | Henry | 250/577 |
| 4,443,699 | 4/1984 | Keller | 250/227 |
| 4,501,972 | 2/1985 | Foerster, Jr. et al. | 250/577 |
| 4,508,970 | 4/1985 | Ackerman | 250/577 |
| 4,544,840 | 10/1985 | Keller | 250/573 |
| 4,625,549 | 12/1986 | Mahoney | 250/577 |
| 4,794,263 | 12/1988 | Katsuoka et al. | 250/577 |
| 4,834,533 | 5/1989 | Horike et al. | 250/227 |
| 4,843,247 | 6/1989 | Yamazoe et al. | 250/573 |

*Primary Examiner*—David C. Nelms
*Assistant Examiner*—Stephone B. Allen
*Attorney, Agent, or Firm*—Sprung Horn Kramer & Woods

[57] ABSTRACT

In the method for detecting the point of immersion or emergence of a solid or porous body into or out of a liquid, surface waves are generated in the liquid and the light coming from a light source and reflected on the surface of the liquid is scanned photoelectrically. Only the alternating light component of the reflected light is detected here and the rectified alternating light signal is compared with a preset threshold value. When the actual value falls below or exceeds the threshold value, a control signal is then generated which can be utilized for control or regulating actions. For detecting the alternating light component, the photoelectric scanning signal is differentiated. Advantageously, scanning of the surface of the liquid is carried out at a plurality of points. The resulting rectified alternating light components can subsequently be added up, and the total value can be compared with the preset threshold value.

8 Claims, 3 Drawing Sheets

METHOD FOR DETECTING FLOODING OF A SURFACE

BACKGROUND OF THE INVENTION

The invention relates to a method for detecting the point of immersion or emergence of a solid or porous body into or out of a liquid. The last mentioned process criterion plays an important part in chemical process engineering when, in liquid/solid separation processes such as, for example, decanting, filtration or vacuum filtration, the point in time of the liquid level entering the solid cake is to be detected as exactly as possible. For example, the treatment of the filter cake with a washing liquid or conditioning liquid can then be carried out in a controlled manner. "Controlled" here means that the quantity of washing liquid is minimized and, on the other hand, excessive drying of the solid is avoided.

Moreover, during filling or emptying of vessels, exceeding of or falling below a certain liquid level is to be detected.

Ultrasonic sensors, laser sensors and radiometric sensors are known for the scanning of liquid levels. However, these are designed above all as liquid level indicators and do not give an adequate measured signal when a surface is flooded or a liquid passes through a surface of a solid.

SUMMARY OF THE INVENTION

This is the starting point of the invention. The object is to develop for the chemical industry a universal sensor for detecting flooding of a surface or passing of a liquid level through a surface of a solid, which sensor operates reliably and safely, independently of the following process parameters and criteria:
(a) Physical and chemical properties of the products employed, such as, for example, colour, particle size, composition of solid or liquid,
(b) Level of the solid and liquid in the vessel,
(c) Geometrical data with respect to the vessel and any internals located therein.

According to the invention, this object is achieved when,
(a) surface waves are generated in the liquid,
(b) the surface of the liquid is illuminated and the reflected light is scanned photoelectrically,
(c) only the alternating light component of the reflected light is detected and
(d) the rectified alternating light signal is compared with a preset threshold value and, when the actual value falls below or exceeds the threshold value, a control signal is generated.

The wavelength of the measuring light used can be in the visible region, but also in the UV region or IR region.

For detecting the alternating light component, the photoelectric scanning signal is advantageously differentiated with respect to time.

Advantageously, the surface of the liquid is photoelectrically scanned at a plurality of points and the corresponding rectified alternating light components are added up. The total value formed is then compared, as described above, with the preset threshold value.

It has been found in practice that this sensor principle is so sensitive that the swaying of the building and vibrations of the chemical equipment, items which normally occur in a chemical production plant, are already sufficient to set the liquid surface into oscillations and to generate surface waves of adequate intensity. For the case that such disturbances are absent or are too weak to generate surface waves of sufficient amplitude, oscillations must be excited in the surface of the liquid. For this purpose, the surface of the liquid can be set into oscillations by regularly striking drops, for example with the aid of a dropping device, or can be blown upon by a nozzle.

For scanning and detecting a liquid level in a vessel, a plate or a body of a plate-like shape is moved in the vessel to the intended level of the liquid and can then be used as a reference level for the liquid, for example during filling or emptying procedures of the vessel, and the photoelectric control signal arising on flooding of the plate surface can be utilized for stopping the filling or emptying procedure.

Preferably, the method according to the invention is employed in conjunction with filtration or pressure/vacuum filtration processes. In this case, the control signal arising on passing of the liquid level through the surface of the filter cake is utilized for stopping the filtrate run-off, in order then to initiate a flow of washing liquid through the filter cake.

The equipment for carrying out the sensor method described above, including its variants, is characterized according to the invention by a light source for illuminating the surface of the liquid, a plurality of photodetectors for detecting the light reflected on the surface of the liquid, an evaluation circuit with differentiating elements for differentiation with respect to time of the signals applying to the photoreceivers, rectifiers allocated to the photoreceivers with an adding circuit for forming the total of all the rectified photoreceiver signals, and by a comparator circuit which emits a control signal when the total of the photoreceiver signals falls below or exceeds a preset threshold value.

The sensor method according to the invention allows a definite distinction between a liquid phase and a solid phase and thus gives a characteristic feature classification for detecting the point in time when the surface of the liquid enters a solid cake or a surface is flooded. The particular advantages of the invention reside in its process engineering benefits because, in this way, a gap in the automatic control of filtration and pressure/vacuum filtration processes is closed. Washing by through-flow, wherein the mother liquor is displaced from the filter cake by washing liquid, without the cake having been blown dry beforehand, is here of particular importance.

Unless cracks have formed in the filter cake during removal of moisture before washing by throughflow, washing of the cake can—with the same washing result—be carried out with only fractions of the quantity of washing liquid which would be required for filter cakes where cracks have formed. In the case of filtration in agitated pressure filters, there is a particular risk of cracks forming because of the size of the filter area. Such cracks can now be avoided by the method according to the invention, since the run-off of filtrate is now stopped at the moment when the entire surface of the cake just emerges from the liquid. Since crack formation is prevented, run-off of unutilized washing liquid can be minimized, so that considerable quantities of washing liquid can be saved, as compared with hitherto. These savings not only reduce the operating costs but also facilitate disposal and therefore contribute to protection of the environment. Furthermore, the entire pressure/vacuum filtration procedure can be shortened considerably. Finally, it is also possible to set a more homogeneous and more reproducible product purity. Furthermore, with the exact detection in time of the entry of liquid levels into a solid cake, a process indicator is available which, in combination with the measurement of pressure, concentration and cake height, allows conclusions to be drawn regarding the product properties such as, for example, cake resistance, particle size, porosity and others. Further, above all constructional advantages are that the sensor heads operating by the method according to the invention can, as compact units, be installed at almost any desired locations, and above all also retrofitted in plant tanks or vessels. An explosion-proofed design (for example EX-zone 1 in protection type EEx ib II C T 4) can here readily be used.

An illustrative example of the invention is explained in more detail below by reference to drawings, in which:

BRIEF DESCRIPTION OF THE INVENTION

DETAILED DESCRIPTION OF THE INVENTION

Figure 1:
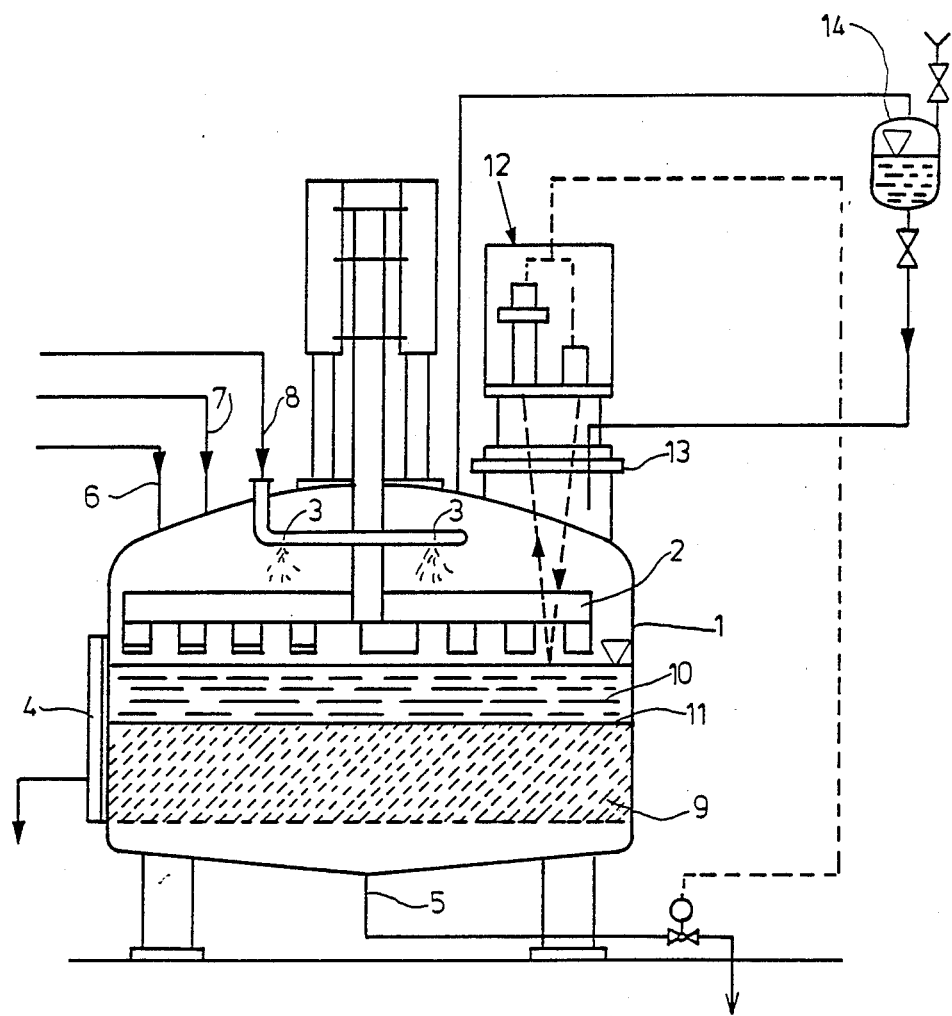
FIG. 1 shows a pressure filter with installed liquid/solid sensor.

The pressure filter according to FIG. 1 consists of a vessel 1, an agitator 2, nozzles 3 for spraying a washing liquid on, a discharge 4 for the solid and a filtrate drain 5. In addition, feed lines 6, 7 and 8 for a pressurized gas, the suspension which is to be filtered and for the washing liquid are provided. In the lower part of the vessel 1, there is the filter cake 9 which rests on a pressure filter plate and which is covered with a layer of liquid 10. The liquid 10 can here be the mother liquor which is to be filtered off or a washing liquid.

As already described above, the point in time of immersion of the liquid 10 into the filter cake 9 during filtration is of great importance in process engineering. The point in time of immersion is characterized in that the liquid level just coincides with the surface 11 of the solid. To detect the passage of the liquid level through the surface 11 of the solid, when the liquid level is falling, or to detect the flooding, just starting, of the surface of the solid if the liquid level is rising, a sensor head 12 is disposed on a flange 13 of an inspection window laterally above the vessel 1, the function of this sensor head being described in more detail below. A dropping device 14, which consists merely of a stock vessel and feed lines, is connected to the same flange 13.

By means of the dropping device 14, drops are generated which strike the surface of the liquid 10 in the vessel 1. As a result, surface waves which propagate across the liquid 10 are generated periodically.

Figure 2:
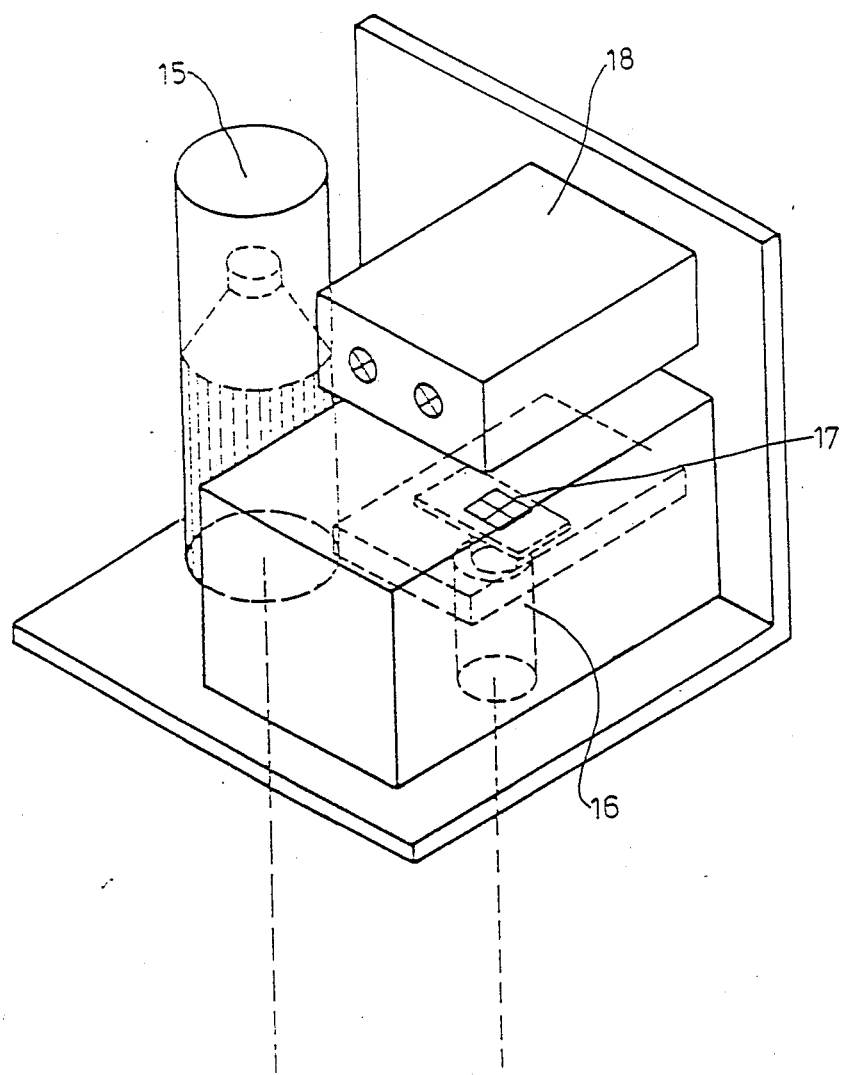
FIG. 2 shows the sensor head in a perspective illustration.
Figure 3:
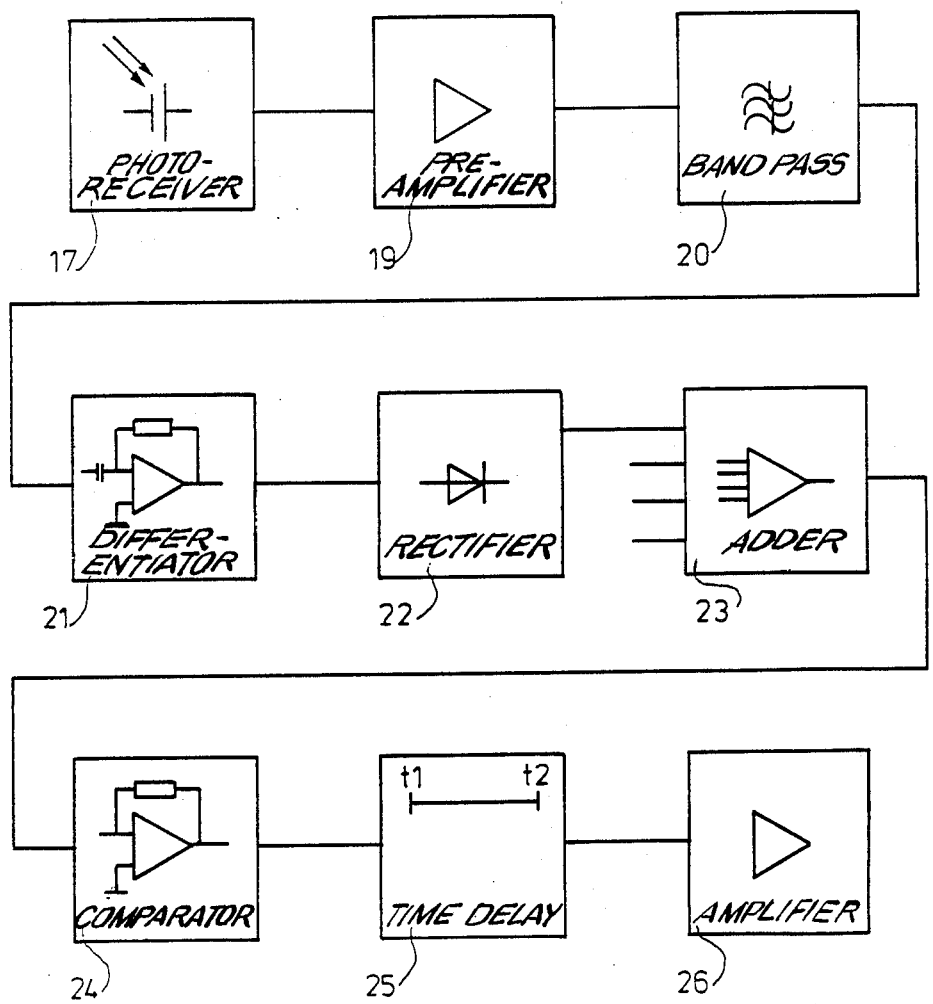
FIG. 3 shows a block diagram of the evaluation electronics.

The sensor head 12 shown in FIG. 2 consists of a light source 15 in a pressure-resistant encapsulation, a lens system 16 which forms an image of the reflected light from the light source 15 on a plurality of photoreceivers 17 (photoarray) arranged side by side, and evaluation electronics 18 connected to the photoreceivers. The function of the evaluation electronics is described by reference to FIG. 3.

The light reflected on the surface of the liquid is detected by the photoreceivers 17. The intensity of the reflected light beam is modulated by surface waves in the liquid. The surface waves are either artificially generated by the dropping device 14 described above, or arise already by vibrations and mechanical shocks which, as experience shows, are frequently caused in chemical production plants by motors or pumps installed for other purposes. Experience has shown that a demand for a completely quiet surface of a liquid would, conversely, rather create a problem in chemical plants. The surface waves necessary for the functioning of the sensor method are therefore already present in practice and have to be artificially generated only in special cases.

The scanning signal applied to a photoreceiver 17 is amplified (preamplifier 19), fed via a band pass 20 to a differentiating element 21 and then rectified (rectifier 22). A circuit 19, 20, 21, 22 is here allocated to each photoreceiver, that is to say the photoelectric scanning signals (4 photoreceivers according to FIG. 2) are separately amplified, filtered, differentiated and then rectified. The differentiation with respect to time thus detects only the alternating light component which is to be ascribed to the surface waves. In contrast, the constant light always present is eliminated.

The rectified alternating light components are then added up by an adding circuit 23 and the total value is compared in a comparator 24 with a preset threshold value. The comparator 24 emits a control signal when the actual value falls below or exceeds the set threshold value. To adjust a time delay, which may be necessary, a delay element 25 is provided downstream of the comparator 24. The delayed control signal can finally be yet further amplified by an output amplifier 26, for example in order to actuate valves or other control elements in the feed lines 7 and 8 or in the filtrate drain 5.

The sensor method described here is based on the classification feature that the alternating light signals applied to the photoreceivers 17 undergo a maximum change when the liquid level passes through the surface of the solid or the latter is flooded (in the case of rising liquid level). In principle, a single measurement channel with one photoreceiver 17 would suffice. Greater reliability is achieved, however, if, as described above, a plurality of photoreceivers is used, the scanning signals of which are added up.

The sensor principle was described here in conjunction with the passing of the surface of a liquid through the surface of a solid in a pressure filter. However, the method according to the invention can also be used very successfully in other ways. For example when a vessel is drained, a problem which frequently arises is that the liquid level must not fall below a defined value or the point in time when the vessel empties must be detected accurately. In this case, a plate serving as a reference level is installed at the height of the critical liquid level. As soon as the liquid level has reached the plate located in the scanning field of the photoreceivers, the alternating light component undergoes a sudden change. Thus, for example, with a rising liquid level, the alternating light component appears for the first time when the liquid just floods the plate, whereas, conversely, it virtually disappears when, in the case of falling liquid level, liquid is virtually no longer present on the plate. In the case of complete draining of the vessel, the vessel bottom serves as the reference level for the liquid. The control signal generated on passing of the liquid level through the reference level can be utilized analogously to the control steps described above, for example for stopping a filling or emptying procedure.

We claim:

1. A method for detecting the point of immersion or emergence of a solid or porous body into or out of a liquid, comprising
   (a) generating surface waves in the liquid,
   (b) illuminating the surface of the liquid and scanning the reflected light photoelectrically,
   (c) detecting only an alternating light component of the reflected light and
   (d) comparing the alternating light signal component with a preset threshold value and generating a control signal when the actual value falls below or exceeds the threshold value.

2. The method according to claim 1, wherein detecting comprises differentiating the photoelectric scanning signal.

3. The method according to claim 1, wherein scanning comprises photoelectrically scanning the surface of the liquid at a plurality of points and comparing comprises adding the corresponding detected alternating light components and comparing the total value with the threshold value.

4. The method according to claim 1, wherein generating surface waves comprises setting the surface into oscillations by drops striking the surface.

5. The method according to claim 1 wherein generating surface waves comprises blowing onto the surface of the liquid to set it into oscillations.

6. The method according to claim 1, wherein the reflected light is scanned with at least one photoreceiver and further comprising disposing a plate in a vessel and located in a scanning field of the at least one photoreceiver with a surface of the plate used as a reference level for liquid during filling or emptying procedures of the vessel, and using the control signal arising on flooding of the plate surface for stopping the filling or emptying procedure.

7. The method according to claim 1, wherein during filtration of a suspension, using the control signal arising on passing of the liquid level through the surface of a filter cake for stopping filtrate run-off, and to then initiate a flow of washing liquid through the filter cake.

8. An apparatus for detecting the point of immersion or emergence of a solid or porous body into or out of a liquid, comprising: a light source (15) for illuminating a surface of a liquid, a lens system (16) for forming an image of the illuminated surface, a plurality of photodetectors (17) for detecting the light reflected from the surface of the liquid, an evaluation circuit (18) with differentiating elements (21) for differentiation with respect to time of the signals applied to the photoreceivers (17), rectifiers (22) allocated to the photoreceivers with an adding circuit (23) for forming the total of all the rectified photoreceiver signals, and a comparator circuit (24) which emits a control signal when the total of the photoreceiver signals falls below or exceeds a preset threshold value.

* * * * *